US 6,651,330 B2

(12) United States Patent
Yamanaka et al.

(10) Patent No.: US 6,651,330 B2
(45) Date of Patent: Nov. 25, 2003

(54) TORQUE CONVERTER

(75) Inventors: Shigeaki Yamanaka, Hiroshima (JP); Toshio Kobayashi, Tokyo (JP)

(73) Assignees: Kubota Iron Works Co., Ltd, Hiroshima (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/193,202

(22) Filed: Jul. 12, 2002

(65) Prior Publication Data

US 2003/0070294 A1 Apr. 17, 2003

Related U.S. Application Data

(62) Division of application No. 09/971,665, filed on Oct. 9, 2001, now Pat. No. 6,594,895, which is a division of application No. 09/429,170, filed on Oct. 28, 1999, now Pat. No. 6,474,062.

(30) Foreign Application Priority Data

Oct. 30, 1998 (JP) .......................... 10-310059

(51) Int. Cl.$^7$ ............................................ B21K 25/00
(52) U.S. Cl. ........................................ 29/889.5; 29/458
(58) Field of Search ................ 29/889, 889.5, 29/434, 437, 458, 889.21; 416/180

(56) References Cited

U.S. PATENT DOCUMENTS 2,505,820 A * 5/1950 Zeidler .................... 29/889.21
2,779,292 A * 1/1957 Zeidler ...................... 416/180
5,282,362 A * 2/1994 Renneker et al. .......... 29/889.5

FOREIGN PATENT DOCUMENTS

JP       62187531 A * 8/1987 .................. 29/889

* cited by examiner

Primary Examiner—Gregory Vidovich
Assistant Examiner—Marc Jimenez
(74) Attorney, Agent, or Firm—Wenderoth, Lind & Ponack L.L.P.

(57) ABSTRACT

A torque converter comprises an impeller shell, a pump impeller integrally formed with the impeller shell, a turbine runner, a stator, a front cover, and at least one of a flanged portion through which a driving power of an engine is transmitted and a ring gear for a starter. The flanged portion is formed on an outer peripheral portion of an outer hull that includes the impeller shell and the front cover. A pilot boss portion is disposed at an axial portion of the front cover and is adapted to be fitted to a crank shaft of the engine, and a sleeve-like oil pump driving shaft is disposed at an axial portion of the impeller shell and is adapted to drive an oil pump. The pilot boss portion is formed integrally with the front cover through a plastic working operation, and the flanged portion formed at a front portion of the outer periphery of the front cover is increased in thickness through a plastic working operation that forms the flanged portion as a lamination.

19 Claims, 11 Drawing Sheets

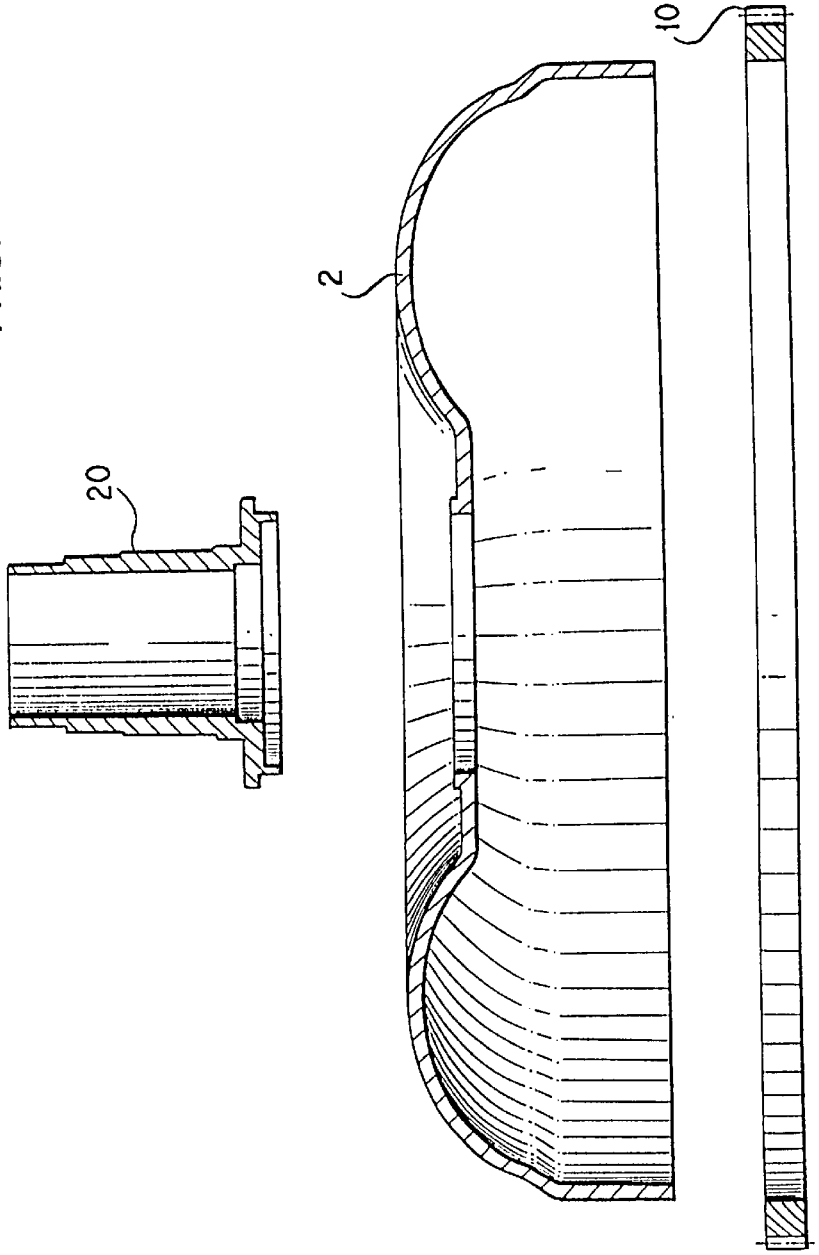

TORQUE CONVERTER

This application is a divisional application of Ser. No. 09/971,665 now U.S. Pat. No. 6,594,895, filed Oct. 9, 2001, which is a divisional application of Ser. No. 09/429,170 now U.S. Pat. No. 6,474,062, filed Oct. 28, 1999.

BACKGROUND OF THE INVENTION

The present invention relates to a torque converter used for an automatic transmission mechanism of a vehicle and, more particularly, relates to components constituting an outer hull of a torque converter.

The torque converter of an automobile is equipped with a lock-up clutch which functions to improve fuel consumption of an engine while giving two operation modes, with one operation mode corresponding to a torque converter state and the other operation mode corresponding to a lock-up state. In the first operation mode (torque converter state), an output element is rotated with increasing torque by a reaction force of a stator while circulating a hydraulic oil to an impeller of the output element (generally a turbine runner) and a reaction element (generally a stator) by the rotation of an impeller of an input element (generally a pump impeller) driven by the engine. And in the second operation mode (lock-up state), the engine turns the output element by coupling the input and output element by fixing the lock-up clutch.

The Japanese Examined Patent Publication No. HEI 7-33861 of the same application discloses conventional examples of a front cover and a pump impeller, which are constructional elements of a torque converter equipped with a lock-up mechanism of the type mentioned above.

In such conventional examples, rotating power from the engine is transmitted to a flange portion, which performs an inertia function, and a starter gear is meshed with an annular ring gear. The flange and the annular ring gear are formed on an outer peripheral surface of the torque converter. The ring gear is meshed with a pinion of a starter motor at a starting time of the engine operation for transmitting the rotating force of the starter motor to a crank shaft of the engine.

FIG. 1 shows a structure of the torque converter provided with the conventional lock-up mechanism mentioned above.

With reference to FIG. 1, the torque converter 1 is composed of a pump impeller 3 formed by integrally coupling an impeller 2a to an impeller shell 2, a turbine runner 4 and a stator 5. The impeller shell 2 of the pump impeller 3 is integrally coupled to a front cover 6 by welding. The front cover 6 is formed on an outer peripheral surface with an annular flange portion 7, and a drive plate 9 coupled to an engine crank shaft 8 is fastened to the flange portion 7 by a bolt. A ring gear 10 for the stator 5 is provided at an outer peripheral surface of the impeller shell 2.

The detailed structure of the conventional torque converter will be further explained hereunder with reference to FIG. 1.

The turbine runner 4 is mounted to a turbine hub 12 by rivets, for example, and an input shaft 13 is connected to the turbine hub 12 via a spline coupling engagement. The stator 5 is supported by a hollow fixed shaft 17 through an outer race 14. A sprag 15 and an inner race 16 constitute a one-way clutch to be rotatable in one direction. The hollow fixed shaft 17 is fastened to a housing 19 of an oil pump 18 by bolts and is coupled to the inner race 16 via a spline engagement.

An oil pump driving shaft 20 in the shape of a sleeve is provided at a shaft core portion of the impeller shell 2 of the pump impeller 3, and an inner rotor 21 of the oil pump 18 is coupled to the oil pump driving shaft 20 so as to be driven rotatably.

One example of such coupling structure of the inner rotor 21 to the oil pump driving shaft 20 of the impeller shell 2 is disclosed in the Japanese Utility Model Laid-open Publication No. HEI 5-34348). That is, a flat portion is formed on an outer periphery of a front (tip) end portion of the oil pump driving shaft 20, and another flat portion is formed on an inner surface of the inner rotor 21 of the oil pump 18, and when both flat portions are engaged, the oil pump driving shaft 20 and the inner rotor 21 of the oil pump 18 are coupled to be driven in a rotational direction.

Further, an outer periphery of a cylindrical portion of the oil pump driving shaft, at an approximately axial central portion of the oil pump, is rotatably supported by an inner peripheral surface of a bush 22 fixed to the housing 19 of the oil pump 18 so as to bear the driving load of the oil pump 18 at this portion. Accordingly, a driving load in proportion to a discharge pressure (line pressure) of the oil pump 18 is applied to the flat portion of the oil pump driving shaft 20 and the portion thereof supported by the bush 22.

Stator collars 23a and 23b are mounted on both sides of the sprag 15 of the one-way clutch, and thrust bearings 24a and 24b are interposed between a pilot boss portion 32, as described hereinafter, and the turbine hub 12 and between the stator collar 23b and the oil pump driving shaft 20, respectively.

The pump impeller 3 driven by the rotation of the crank shaft 8 of the engine acts to circulate the hydraulic oil filling a torque converter chamber 25. The hydraulic oil circulates in passages of the respective impellers of the pump impeller 3, the turbine runner 4 and the stator 5, whereby the turbine runner 4 is rotated while increasing the torque by the reaction force due to the operation of the stator 5, and the rotating force is transmitted to the input shaft 13 through the turbine hub 12 and then to an automatic transmission mechanism or non-stage transmission mechanism, not shown.

A lock-up clutch hub 27 of a lock-up clutch 26 is fastened to the turbine hub 12 by rivets, and the lock-up clutch hub 27 is provided with a torsional damper 28 for damping a shock at a time of clutch engagement and for absorbing vibrations or noises of the driving system.

The lock-up clutch 26 is provided with a lock-up piston 29 at a portion between the lock-up clutch hub 27 and the front cover 6. And the lock-up piston 29 is fitted to the turbine hub 12 in a fashion that the inner peripheral portion of the lock-up piston 29 is slidable in an axial direction of the turbine hub 12 in a liquid tight manner with respect to the outer peripheral portion of the turbine hub 12. The inside inner peripheral portion of the torsional damper 28 is spline-engaged with the outer peripheral portion of the lock-up clutch hub 27. Further, the lock-up piston 29 is provided with a lock-up facing 30 on a side surface portion on the side of the front cover 6.

A front hydraulic chamber 31 is defined between the lock-up piston 29 and the front cover 6. The engine crank shaft 8 is formed with a center hole into which a pilot boss portion 32 protruding from the front cover 6 is fitted so as to achieve a rotational axis alignment of the torque converter 1. The front hydraulic chamber 31 is communicated with an oil passage 33 formed within the input shaft 13 and is then communicated with a control valve of a hydraulic controller of the automatic transmission mechanism or non-stage transmission mechanism, not shown.

The torque converter 1 has an oil passage between the hollow fixed shaft 17 and the oil pump driving shaft 20. The passage is communicated with a groove formed on the side surface of the thrust bearing 24b disposed between the stator collar 23b and the oil pump driving shaft 20. This passage is then communicated with the hydraulic controller.

At the lock-up time, a hydraulic pressure is applied to the turbine-side side surface of the lock-up piston 29 from the inside of the torque converter 1 through the oil passage between the stator collar 23b and the oil pump driving shaft 20, and at the same time, the pressurized oil in the front hydraulic chamber 31 is drained to thereto cause a pressure difference between the front and rear portions of the lock-up piston 29 (so as to make the hydraulic pressure in the front hydraulic chamber 31 smaller than that in the torque converter). Thus, the lock-up piston 29 is pushed to the front cover 6, and via the lock-up facing 30 the lock-up state is achieved.

Further, when the lock-up state is to be released, the pressurized oil is supplied into the front hydraulic chamber 31, and the hydraulic pressure in the oil passage from the inside of the torque converter 1 is controlled by the control valve of the hydraulic controller to cause a pressure difference between the front hydraulic chamber and the torque converter (so as to make the hydraulic pressure in the front hydraulic chamber 31 larger than that in the torque converter), whereby the lock-up state is released.

In the torque converter 1 of the structure mentioned above, the outer hull has the front cover 6 and the impeller shell 2. As the outer hull is generally formed by a thin steel plate having projections (protrusions), thickened portions and thinned portions may be formed partially as required.

The thickness may be changed if a certain strength or rigidity is required, and the outer hull portion of the torque converter 1 has a thickened flanged portion 7 for receiving inertia. The outer hull has the drive plate 9 tightened thereto by bolts, or there is provided a pilot boss portion 32 adapted to align the crank shaft with the front cover 6. These members are independently manufactured and integrally assembled together by welding, for example, as shown in FIG. 2.

The impeller shell 2 will be manufactured such as shown in FIG. 3. That is, the ring gear 10, the sleeve-shaped oil pump driving shaft 20 and so on, which are independently manufactured, are welded to the outer peripheral portion and the inner peripheral portion, respectively, of the impeller shell 2 which is formed of a thin iron plate.

A centrifugal force is generated in accordance with the increase of the engine revolution, an axial thrust force is generated due to the circulation of the hydraulic fluid through the pump impeller 3, the turbine runner 4 and the stator 5, in this order, and a working force of the lock-up clutch 26 is also generated. These forces are applied to the outer structural members or portions constituting the outer hull of the torque converter 1. For this reason, it is necessary for the outer structural members, such as impeller shell 2 and the front cover 6, to be capable of withstanding such forces and suppressing deformation thereof, such as axial swelling, within an allowable predetermined value. In this regard, for example, it is preferred that the front cover 6 is formed of an iron plate having a relatively large thickness of about 4.5 to 6 mm and the impeller shell 2 is formed of an iron plate having a thickness of about 3 to 4 mm.

In the prior art mentioned hereinbefore, the sleeve-shaped oil pump driving shaft 20 integrally coupled to the impeller shell 2 is formed at its rear end portion with a flat portion which is fitted to a flat portion formed on the inner peripheral portion of the inner rotor 21 of the oil pump 18, to thereby rotate the pump. Furthermore, the cylindrical portions, other than the flat portions are also provided with high accuracy so as to achieve rotational alignment between the oil pump driving shaft 20 and the oil pump rotor, including the inner rotor 21 and outer rotor.

Furthermore, a hydraulic pressure of the automatic transmission mechanism (i.e. pump discharge pressure or line pressure) generated by the inner rotor 21 of the oil pump 18 is applied to a projected area of the outer periphery of the oil pump rotor, so that a load corresponding to the projected area acts on the fitting portion of the central cylindrical portion of the oil pump shaft 20 and the inner rotor 21. The load acting on this fitting portion constitutes a moment load corresponding to a distance from the bush 22 supporting the central portion of the oil pump driving shaft 20 to the fitting portion of the inner rotor 21, and the moment load hence acts on the bush 22. The bush 22 axially supports the entire structure of the torque converter, so that, other than the above load, an eccentric load or swing load due to the misalignment at the mounting time of the torque converter assembly to the drive plate 9 can be supported.

The structure of the outer hull of the torque converter mentioned above and the manufacturing process thereof has provided the following problems.

That is, the front cover and the impeller shell comprise a plurality of parts which are respectively independently manufactured, and the parts are thereafter assembled integrally by welding, for example, so that many processes are required, involving much cost as well as low production efficiency.

Furthermore, since in general, the body of the front cover is manufactured through a press working operation, a soft steel plate is generally used because of its good formability (yieldability). However, it is necessary to increase the thickness of the soft steel plate in order to ensure the strength and rigidity thereof, when used with high revolution and high torque engines, because the front cover body bears the centrifugal hydraulic pressure generated in the rotating torque converter and is subjected to the thrust load from the turbine runner and the pressing load of the lock-up clutch. Accordingly, in spite of the fact that it is important to reduce weight and vibration while ensuring the inertia moment that is required for a rotating member, it is difficult to prevent the structure from increasing in weight, whereby problems remain unsolved.

Furthermore, it is required for the torque converter of the automatic transmission mechanism or non-stage transmission mechanism to cooperate with a lean combustion type engine or direct-injection type engine in place of a conventional engine from the viewpoints of environmental pollution and fuel consumption improvement. However, in the torque converter having the outer hull of the conventional structure, issues involved with the above viewpoints have been easily handled by making a member constituting the outer hull thin or mounting an inertial ring to a vacant space. Therefore, it is very difficult for the member constituting the outer hull of the torque converter to have the effective inertia moment against the strong accelerating force from a stopping state of the automobile, and the lightening of the engine due to the problem of vibration of the engine. Accordingly, the weight of the engine has been further increased, constituting further problems of preventing a realization of the reduction of weight or compact structure of the engine.

Further, the oil pump driving shaft, having a thin sleeve shape, which is welded to the pump impeller, is hardened by heat treatment to provide substantially a hardness of HRC18, because a transverse load due to the pump discharge pressure is applied to the fitting portion of the oil pump rotor and a load due to the pump driving torque is applied to the pump rotor driving portion. However, in general, the pump discharge pressure in an automatic transmission mechanism is about 1.5 to 1.8 Mpa, and in a metal-belt type non-stage transmission mechanism the pump discharge pressure is about 4 to 5 Mpa, and accordingly, when used for the automatic transmission mechanism, the drive shaft and the supporting bush of the oil pump are easily broken by fatigue.

As a countermeasure to the above defects, there is considered a change to a material hardened by heat treatment, such as high-frequency wave (induction) heating, and/or increasing of the thickness of the oil pump driving shaft. There is also considered an entire change of a support structure supporting the pump rotor. However, such countermeasures will make large the entire structure of the apparatus, increase the weight thereof and increase the manufacturing cost, which will hence constitute barriers against improving the production efficiency and the lightening of the apparatus, thus providing problems.

SUMMARY OF THE INVENTION

An object of the present invention is to substantially eliminate defects or drawbacks encountered in the prior art mentioned above and to provide a torque converter capable of reducing the manufacturing cost thereof, realizing a light weight requirement without damaging the strength and rigidity of members constituting the outer hull of the torque converter, and effectively reducing or eliminating fatigue failure of an oil pump driving shaft and damage to a bush rotationally supporting the oil pump driving shaft.

Other objects can be achieved according to the present invention by providing a torque converter which comprises an impeller shell, a pump impeller integrally formed with the impeller shell, a turbine runner, a stator and a front cover. At least one of a flanged portion, through which a driving power of an engine is transmitted, and a ring gear, for a starter, is formed on an outer peripheral portion of an outer hull, which outer hull includes the impeller shell and the front cover. A pilot boss portion is disposed at an axial portion of the front cover and is adapted to be fitted to a crank shaft of the engine, and an oil pump driving shaft in the shape of a sleeve is disposed at an axial portion of the impeller shell and is adapted to drive an oil pump. The pilot boss portion is formed integrally with the front cover through a plastic working operation, and the flanged portion is formed at a front portion of the outer periphery of the front cover through a plastic working operation, and is increased in thickness through the plastic working operation by forming the flanged portion as a lamination.

In a preferred embodiment, a liquid-tight brazing and a coating layer is formed on at least a portion of an inner peripheral side boundary portion of the flanged portion, which is in communication with a screw hole portion formed in the flanged portion.

The sleeve-shaped oil pump driving shaft is formed integrally with the impeller shell through plastic working, and the ring gear for the starter is also integrally formed through plastic working so as to form an increased thickness portion.

The ring gear for the starter can be integrally formed on a rear portion of the outer periphery of the front cover through a plastic working operation. The flanged portion and the ring gear for the starter are integrally formed through plastic working operations on the outer peripheral portion of the outer hull, which is composed of the front cover and the impeller shell, so that the integrally formed portions perform an inertia function and a power transmission function.

At least one of the front cover and impeller shell are formed, through a deformation process, of a steel plate material consisting of, in weight %, C: 0.2–0.6, Si: 0.01–0.1, Mn: 0.05–0.5, Ti: 0.01–0.1, B: 0.001–0.01, and Fe: remainder. An induction hardening is carried out on at least one of a portion of the oil pump driving shaft which is fitted to the rotor of the oil pump, and a bush fitting portion of the oil pump driving shaft that is supported relative to a housing of an oil pump through a bush. An induction micro-wave hardening is also carried out on an inside surface of the oil pump driving shaft, which is opposed to a disc surface of the stator through a thrust bearing. The induction micro-wave hardening is also carried out on at least one of an inner surface of a disc portion of the front cover, a surface of the front cover opposing a turbine hub through a thrust bearing, and a central protruded portion of the front cover.

According to the present invention of the characters and structures mentioned above, the front cover and the impeller shell constituting the outer hull of the torque converter are integrally formed, through the plastic working, with the associated members such as the pilot boss portion, the flanged portion, the ring gear and the oil pump driving shaft. Accordingly, in comparison with the conventional torque converter in which the associated members mentioned above are independently formed and then assembled with the front cover and the impeller shell, which are also independently formed, the productivity of the front cover and the impeller shell of the torque converter according to the present invention provided with the associated members mentioned above can be improved and the manufacturing cost can be reduced. In addition, as the respective members are integrally formed, unnecessarily thickened portions are eliminated, thereby realizing the light weight requirement of the entire structure of the torque converter.

Furthermore, welding of the ring gear for starting the engine, and welding of the flanged portion through which the engine driving power is transmitted, can be effectively eliminated. The elimination of such welding can prevent the formation of irregularly thickened portions due to the welding, and prevent the occurrence of defects which may be caused by the welding. Therefore, the adjustment of rotational balance after the assembling of the torque converter can be easily performed, and moreover, oil leakage due to welding defects will be prevented, whereby the quality of products and the productivity can be improved.

Additionally, according to the present invention, the front cover and the impeller shell are formed of a material including boron (B) in addition to carbon (C) of 0.5 weight %, so that the induction hardening can be effectively applied to the members as required, thereby improving the strength and rigidity of the fitting portion between the oil pump drive shaft and the oil pump rotor and the bush rotation support portion, and the gear teeth of the ring gear to prevent the portions or members from being damaged, worn and deformed.

Additionally, the front cover and the impeller shell can be formed from a steel plate having a thickness thinner than that used for the conventional structure. Moreover, in a case where the engine is operated with a revolution number increased in a red zone under the lock-up condition, a compound force of the centrifugal hydraulic pressure acting on the torque converter and the lock-up clutch engaging load can be generated and at least a permanent deformation can be prevented from occurring, even if a thin steel plate is used, by performing, as required, the micro-wave induction hardening, or partially increasing the thickness of the outer peripheral bent portion at which large bending stress is caused.

Additionally, in spite of the use of the thin steel plate while maintaining the high strength and rigidity, the flanged portion formed on the outer periphery of the front cover is increased in thickness and the ring gear disposed on the outer periphery of the impeller shell is also increased in thickness by a roll spinning process. This ensures that the inertial mass can be most effectively ensured on the outer peripheral portion of the torque converter without arranging an inertia ring as an additional member, as is done in the conventional structure; thus realizing the light weight requirement. In particular, even in a case where it is required to improve an environmental pollution and fuel consumption, as with the use of a lean combustion engine or direct-injection combustion engine, the inertia can be ensured and the light weight can be realized while maintaining the improved productivity and reduced manufacturing cost.

The nature and further characteristic features of the present invention will become more clear from the following descriptions made with reference to the accompanying drawings.

BRIEF DESCRIPTION OF THE DRAWINGS

In the accompanying drawings:

FIG. 3 is a sectional view showing an impeller shell of the torque converter of FIG. 1 for the explanation of a manufacturing process thereof;

DESCRIPTION OF THE PREFERRED EMBODIMENTS

Figure 1:
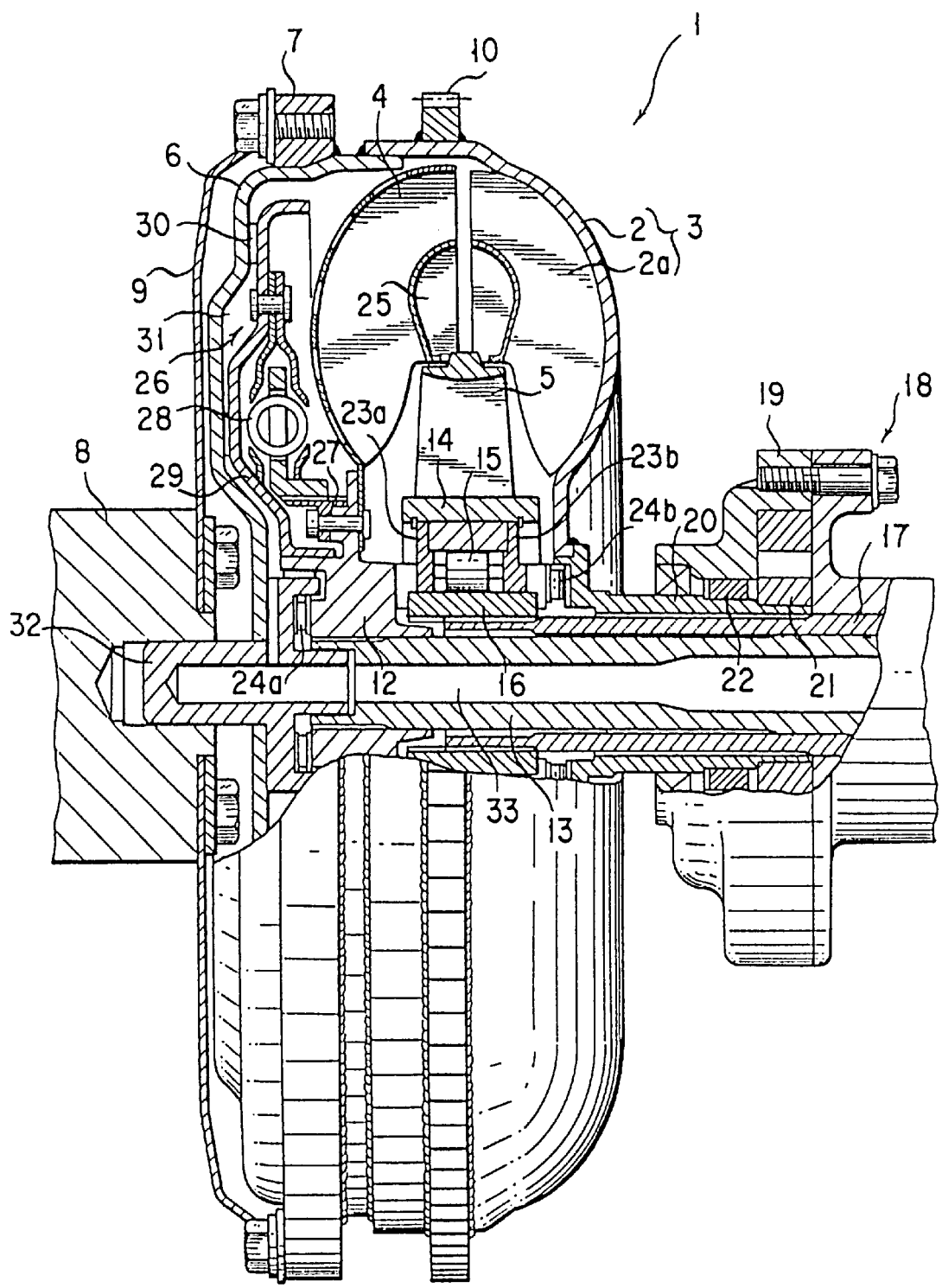
FIG. 1 is a partial sectional view of a main portion of a torque converter of a conventional structure.

A torque converter according to the present invention is entirely shown in FIG. 8, which is provided with an improved impeller shell 102 and front cover 106 as compared with those shown in FIG. 1, and preferred embodiments thereof will be described hereunder with reference to FIGS. 4 to 10, in which Figures reference numerals are applied to members or portions corresponding to those shown in FIGS. 1 to 3.

FIGS. 4A to 4H are views explaining plastic working steps of the front cover 106 in this order.

Figure 4A:
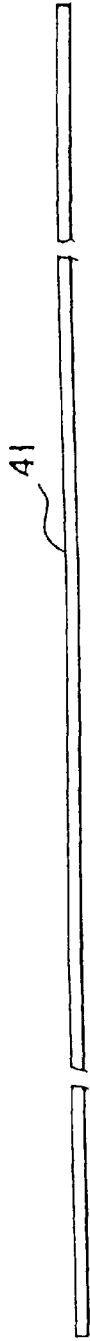
FIGS. 4A to 4H are sectional views showing a manufacturing process of the present invention in the illustrated order.
Figure 4B:
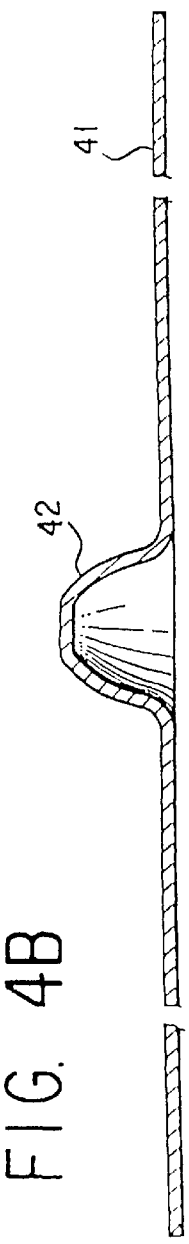
Figure 4C:
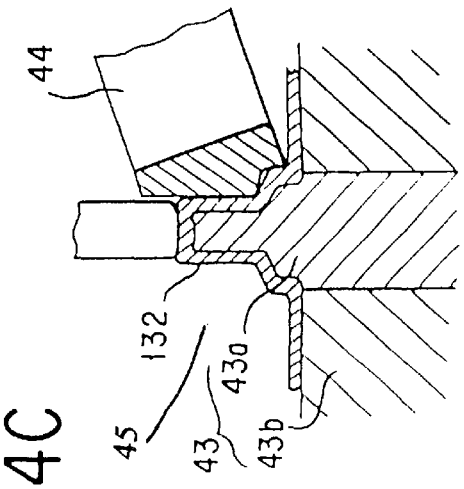

FIG. 4A shows a punch-out step for punching out a disc-shaped material 41 of a predetermined size, FIG. 4B shows a step for forming a swelled or protruded portion 42 at a central portion of the material 41 through a press working operation, and FIG. 4C shows a step for plastically forming a boss portion 45, constituting a pilot boss portion 132 of the front cover 106, by placing the swelled portion 42 on a mold 43 composed of a pin 43a and a die 43b and then press-forming the swelled portion 42 from the upper side thereof by using a forming roller 44. In these steps, the material volume of the swelled portion 42 is larger than that of the boss portion 45, and accordingly, the thickness of the boss portion 45 is made larger than a plate thickness of the material 41. That is, the thickness of the boss portion 45 is increased.

Figure 4D:
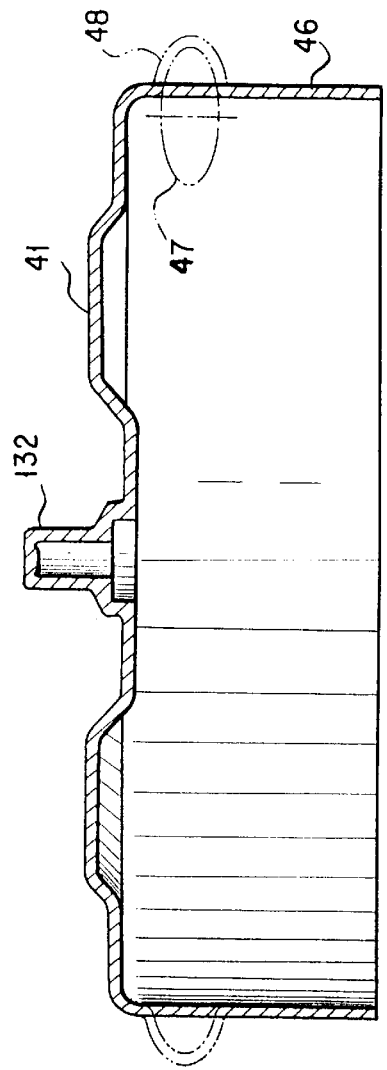
Figure 4F:
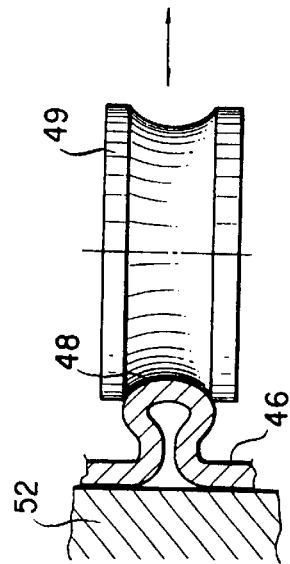

In the next step shown in FIG. 4D, a cylindrical portion 46 is formed from an outer peripheral portion of the material 41 through a press working operation, and a protrusion or projection 48 is formed by a roller 47, so as to project outward in an annular shape from an inside portion of the cylindrical portion 46 to a portion that is to constitute a flanged portion 107.

Figure 4E:
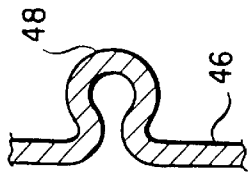
Figure 4G:
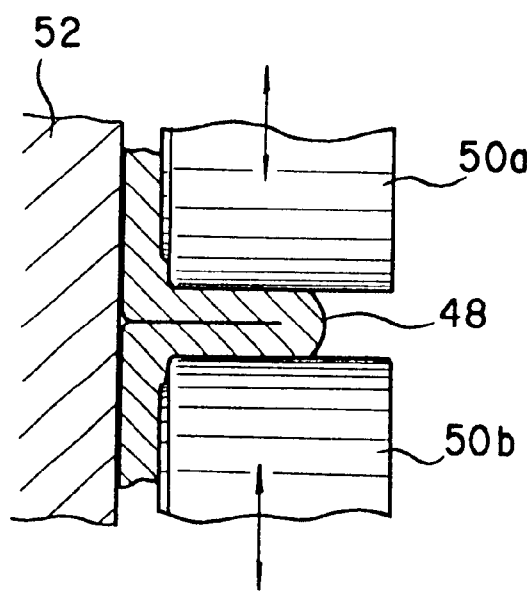
Figure 4H:
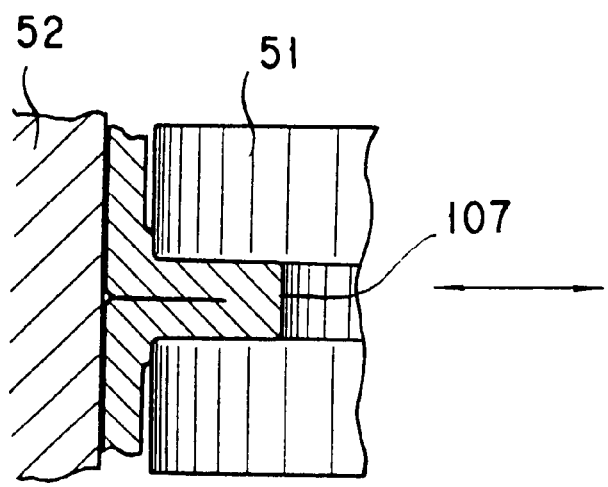

In a step shown in FIG. 4E, the cylindrical portion 46 is pressed in an axial direction thereof, and according to this pressing, buckling is formed at the protrusion 48 so as to provide a substantially Ω-shape section. In a step shown in FIG. 4F, the outer shape of the protrusion 48 is shaped by a roller 49, and the protrusion 48 is then pressed and folded by upper and lower rollers 50a, 50b so as to further form a portion, that is to constitute the flanged portion 107, having a semi-circular front end shape in a step shown in FIG., 4G. Thereafter, in a step shown in FIG. 4H, the front end is shaped by a roller 51 so as to provide a flat end shape, i.e. cylindrical shape of the flanged portion 107. Further, in the steps shown in FIGS. 4F to 4H, a back-up die 52 is disposed against an inside portion of the cylindrical portion 46. Accordingly, after completion of the steps as depicted in FIGS. 4A–4H, the front cover 106 includes the flanged portion 107, which is a monolithic lamination of the material of the front cover.

Figure 5:
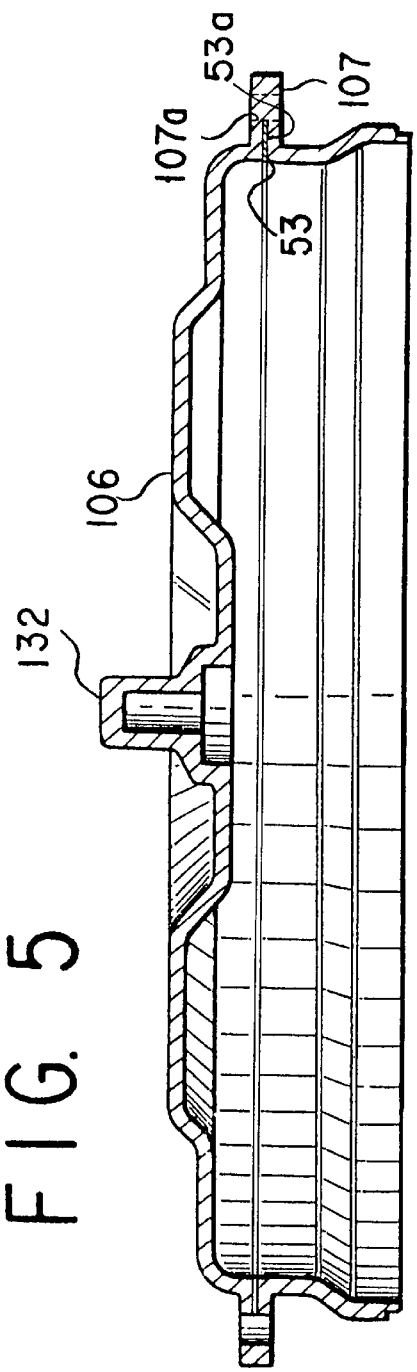
FIG. 5 is a sectional view of the front cover of the torque converter of the present invention.

With reference to FIG. 5, the material 41 is thereafter entirely press-worked to provide the front cover shape, and a screw hole 107a is formed in the flanged portion 107 through drilling. In this step, if the screw hole 107a is communicated with an abutment portion 53 formed by folding the protrusion 48 in the step shown in FIG. 4G, an oil leakage may result. In order to obviate such a defect, a brazing or coating treatment will be applied to thereby form a coating layer 53a, thus performing a fluid-tight sealing of that portion.

Figure 6:
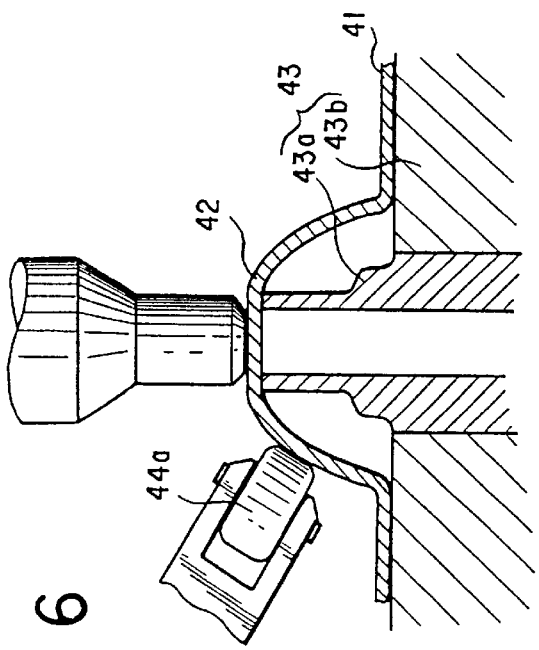
FIG. 6 is a sectional view corresponding to FIG. 4C showing another example of a front cover.

FIG. 6 shows another example for forming the pilot boss portion 132 from the swelled portion 42 formed from the material 41 of the front cover 106. In this example, the swelled portion 42 is formed so as to provide a shape conforming with the shape of a mold 43 by virtue of a roller 44a having a small diameter.

FIGS. 7A to 7F represent steps for the plastic working operations for forming the impeller shell 102.

Figure 7A:
FIGS. 7A to 7F are sectional views showing a manufacturing process of an impeller shell of the present invention.
Figure 7B:
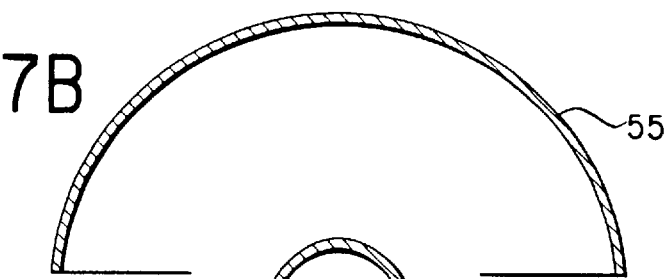
Figure 7C:
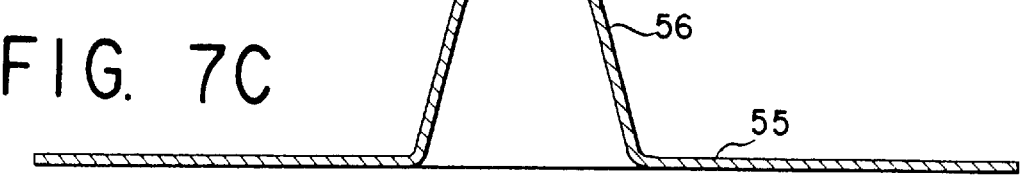
Figure 7D:
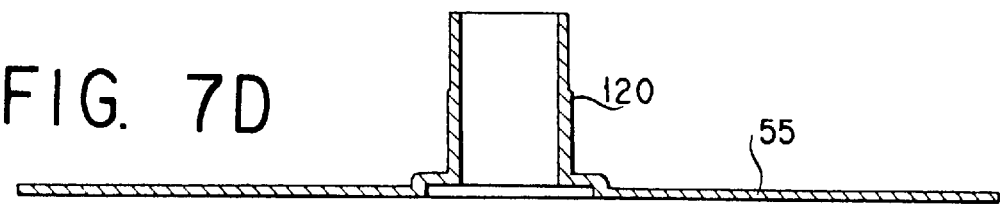

In a step shown in FIG. 7A, a disc-shaped material 55 of a predetermined size is punched out, in a step shown in FIG. 7B the material 55 is shaped via a press working operation so as to provide a semi-spherical shape, and in a step shown in FIG. 7C a swelled or protruded portion 56 is formed via a press working operation in a central portion of the disc-shaped material 55. In a step shown in FIG. 7D, the swelled portion 56 is subjected to a further press working operating so as to provide a sleeve-shaped shaft portion, and an upper end (front end) of this sleeve-shaped shaft portion is cut away, thereby plastically forming an oil pump driving shaft 120.

Figure 7E:
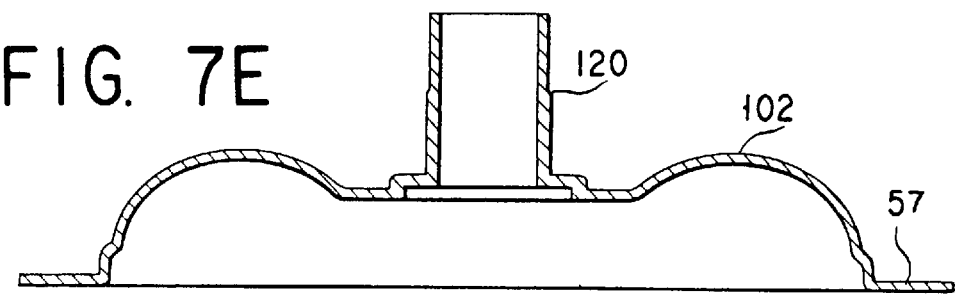
Figure 7F:
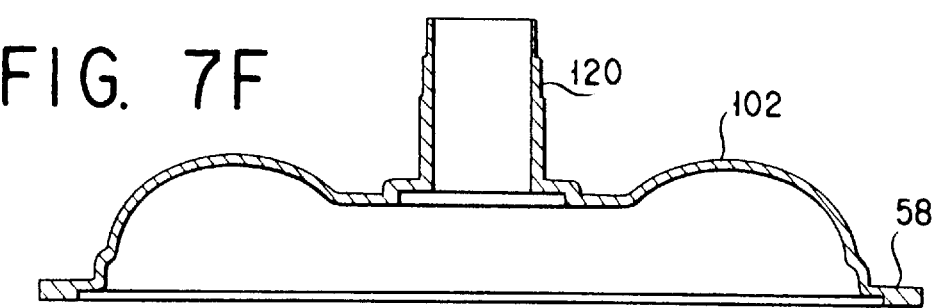

Thereafter, in a step shown in FIG. 7E, the material 55 is entirely press-worked so as to form an impeller shell 102 having a flanged portion 57 at an outer peripheral edge. In a step shown in FIG. 7F, the flanged portion 57 is increased in thickness by performing a roll spinning method, so as to form a thickened portion 58. A ring gear 110 for starting the engine is formed through a rolling method or a machining operation.

Figure 8:
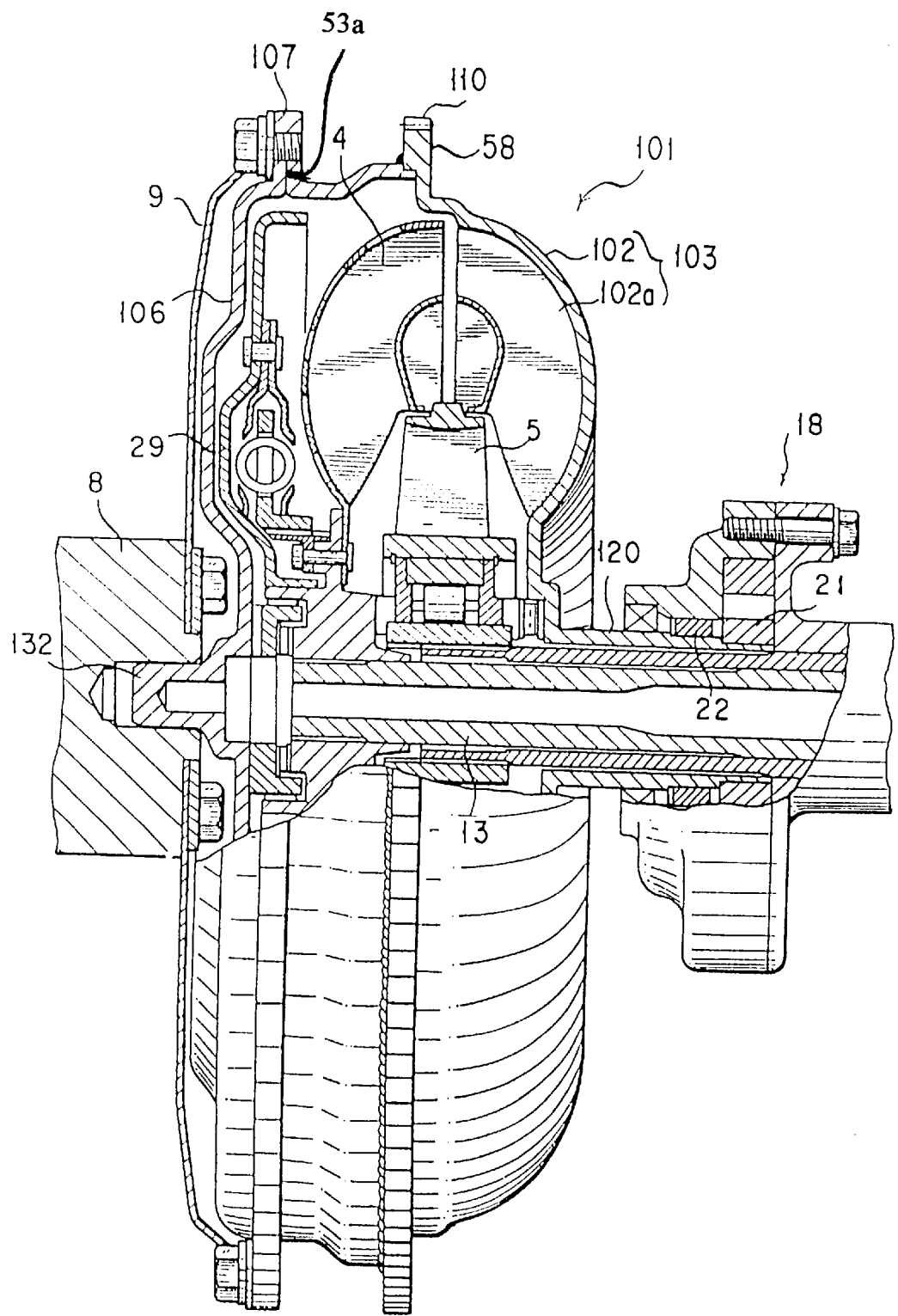
FIG. 8 is a partial sectional view of an essential portion of the torque converter according to the present invention.

FIG. 8 shows the torque converter 101 provided with the impeller shell 102 and the front cover 106 having the structures mentioned above formed in accordance with the steps also mentioned above. The impeller shell 102 is integrally coupled to an impeller 102a to form a pump impeller 103.

Hereunder, there will be described a manner for reducing the weight of the torque converter, and improving the strength and rigidity of the members constituting the torque converter, while ensuring the inertial mass.

Figure 2:
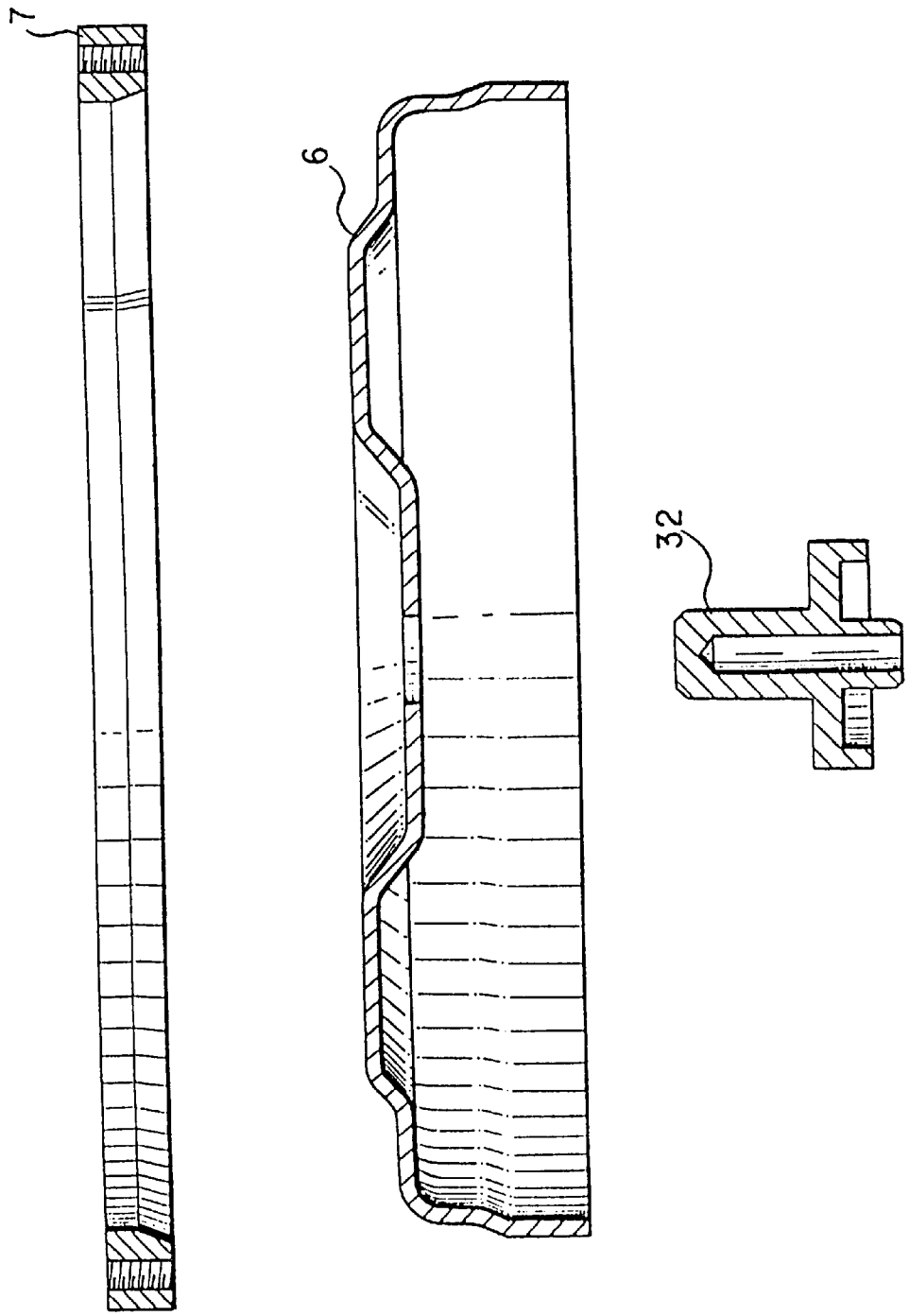
FIG. 2 is a sectional view showing a front cover of the torque converter of FIG. 1 for the explanation of a manufacturing process thereof.

A conventional front cover 6 and impeller shell 2 such as shown in FIG. 1 are formed of a material of SPC or SPHC and have plate thicknesses of 4.9 mm and 3.2 mm, respectively. On the other hand, according to the preferred embodiment of the present invention, the SPC material is replaced by a material which is made by adding a small amount of boron (B) to an alloy material having a steel plate base containing 0.25 weight % carbon (C), and on which an induction hardening process is effectively performed. The SPC material has the best press formability, and although a material containing 0.5 weight % C with B added can provide a high strength, it will provide less press formability. However, by reducing the plate thicknesses of the front cover 106 and the impeller shell 102, a working stress of a conventional extent can be maintained, so that the above replacement of the material does not result in an adverse effect with regard to the production of the torque converter.

Furthermore, as the flanged portion 107 and the ring gear 110 are formed with the increased thicknesses, the reduction of the weight can be realized while ensuring the necessary inertial mass because the portion 107 and the gear 110 are formed on the outer peripheral portions of the torque converter, which are the most effective portions for increasing the inertial mass.

In consideration of the above matters, as the materials 41 and 55 for the front cover 106 and the impeller shell 102, materials of S25CTiB containing titanium (Ti) and B and having thicknesses of 4.5 to 4.2 mm and 3.0 to 2.8 mm are utilized, respectively, in place of steel plate materials (SPC1) having thicknesses of 4.9 mm and 3.2 mm (JIS standard). The respective components of these S25CTiB and SPC1 materials are shown in the following Table 1. Wt. % means weight %.

TABLE 1

| Kind of steel | C | Si | Mn | P | S | Ti | B | Plate Thickness |
|---|---|---|---|---|---|---|---|---|
| S25CTiB | 0.25 (wt. %) | 0.06 | 0.39 | 0.01 | 0.008 | 0.06 | 0.004 | 3.2 (mm) |
| SPC1 | $\leq$0.12 (wt. %) | $\leq$1.2 | $\leq$0.5 | $\leq$0.04 | $\leq$0.045 | — | — | 4.9 (mm) |

Further, although the respective components, other than phosphorous (P) and sulfur, (S) of the steel plate mentioned above usable for the present invention are different with regard to the shapes and functions to be required, a steel of the components in the range described in the following Table 2 will be suitably used, and further, P and S are substantially the same as those in the above S25CTiB. Wt. % means weight %.

TABLE 2

| C | Si | Mn |
|---|---|---|
| 0.20~0.6% (wt. %) | 0.01~0.1% | 0.05~0.5% |
| Ti | B | Elongation |
| 0.01~0.1% | 0.001~0.01% | $\geq$30% |

The front cover 106 and the impeller shell 102 after being plastically formed are strengthened as compared with the conventional ones by effecting induction hardening (including underwater induction hardening) of surfaces of materials containing 0.25 weight % C with B added, such as the portion of the oil ring driving shaft 120 that fits with the inner rotor 21 of the oil pump 18, the portion of the oil ring driving shaft 120 that is supported by the bearing bush 22, the outer peripheral bent portion of the front cover 106 and the inside surface portion of the front cover 106 that is pressed by the lock-up piston 29. This strengthening reduces damage that may be caused by the plate thickness reduction.

Figure 9A:
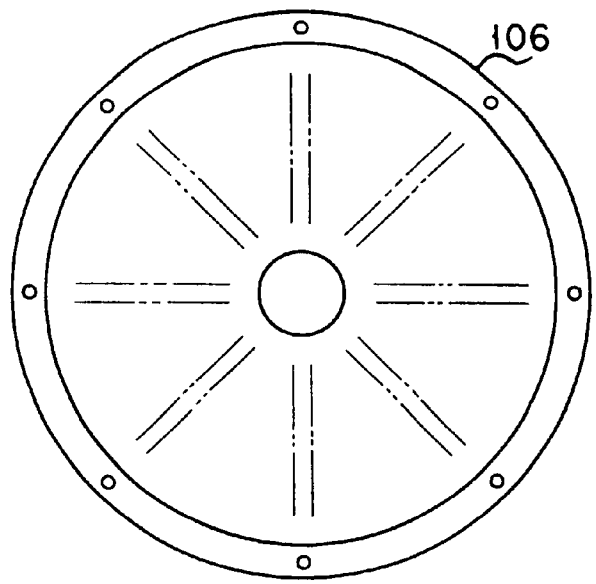
FIGS. 9A and 9B are front views showing patterns formed on the front cover by micro-wave induction hardening.
Figure 9B:
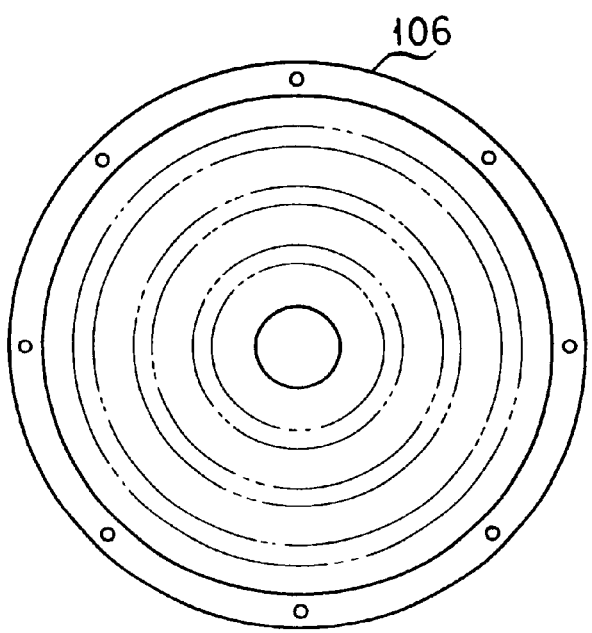

In such an operation, the induction hardening is not a full-surface hardening, and it is preferable that the hardening is performed so as to provide a pattern of radial lines as shown in FIG. 9A or pattern of rings as shown in FIG. 9B.

Figure 10:
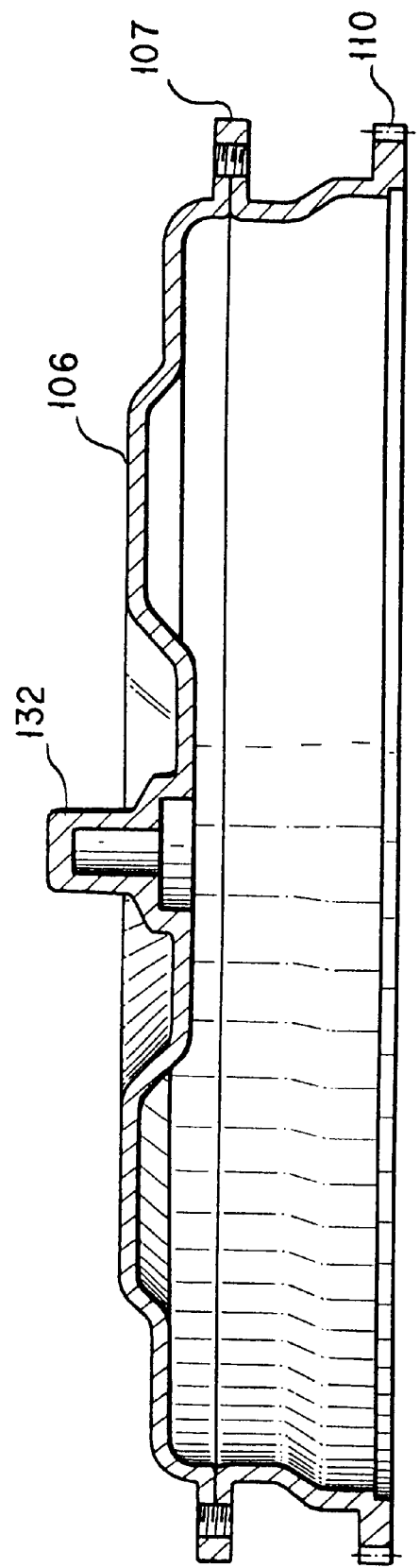
FIG. 10 shows a sectional view of a front cover of the torque converter according to another embodiment of the present invention.

In the above embodiment, although the ring gear 110 for the starter is located on the side of the impeller shell 102, the ring gear 110 may be formed through plastic working to the outer peripheral portion of the front cover 106, together with the flanged portion 107 as shown in FIG. 10.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of manufacturing a front cover of a torque converter, wherein the front cover is to be coupled with an impeller shell of the torque converter to form an outer hull in which a turbine runner is to be contained, said method comprising:

forming a pilot boss portion at a central portion of a disc-shaped material;

forming a cylindrical portion from an outer peripheral portion of said disc-shaped material; and deforming a portion of said cylindrical portion into an annular flanged portion by
  (i) forming an annular protrusion projecting outwardly from said cylindrical portion, then
  (ii) forming said annular protrusion into an annular protrusion having an Ω-shaped cross section by pressing said annular protrusion toward an axis of said cylindrical portion, and then
  (iii) deforming said annular protrusion having the Ω-shaped cross section by pressing said annular protrusion having the Ω-shaped cross section toward the axis of said cylindrical portion and also in opposed directions along the axis of said cylindrical portion.

2. The method according to claim 1, further comprising forming a screw hole in said annular flanged portion.

3. The method according to claim 1, wherein the deforming of the portion of said cylindrical portion into the annular flanged portion includes deforming said portion of said cylindrical portion into a lamination, with said lamination defining said annular flanged portion.

4. The method according to claim 3, further comprising forming a screw hole in said annular flanged portion.

5. The method according to claim 4, wherein the deforming of said portion of said cylindrical portion into the lamination results in an inner peripheral boundary portion of said flanged portion being in communication with said screw hole, and further comprising providing a water-tight brazing and a coating layer at said inner peripheral boundary of said flanged portion.

6. The method according to claim 5, wherein providing a water-tight brazing and a coating layer at said inner peripheral boundary of said flanged portion results in a seal being formed between said screw hole and said inner peripheral boundary of said flanged portion.

7. The method according to claim 1, further comprising providing said disc-shaped material by punching said disc-shaped material from a sheet of material.

8. The method according to claim 7, wherein the deforming of the portion of said cylindrical portion into the annular flanged portion results in a lamination of said portion of said cylindrical portion, with said lamination defining said annular flanged portion.

9. The method according to claim 8, further comprising forming a screw hole in said flanged portion.

10. The method according to claim 9, wherein the deforming of said portion of said cylindrical portion into the lamination results in an inner peripheral boundary portion of said flanged portion being in communication with said screw hole, and further comprising providing a water-tight brazing and a coating layer at said inner peripheral boundary of said flanged portion.

11. The method according to claim 1,
wherein the forming of the pilot boss portion at the central portion of the disc-shaped material includes forming a swelled portion at a central portion of a disc-shaped material by press working said disc-shaped material, and then press forming said swelled portion into said pilot boss portion, and
wherein the forming of the cylindrical portion from the outer peripheral portion of said disc-shaped material includes press working said disc-shaped material.

12. The method according to claim 11, further comprising forming a screw hole in said annular flanged portion.

13. The method according to claim 11, wherein the deforming of the portion of said cylindrical portion into the annular flanged portion includes deforming said portion of said cylindrical portion into a lamination, with said lamination defining said annular flanged portion.

14. The method according to claim 13, further comprising forming a screw hole in said annular flanged portion.

15. The method according to claim 14, wherein the deforming of said portion of said cylindrical portion into the lamination results in an inner peripheral boundary portion of said flanged portion being in communication with said screw hole, and further comprising providing a water-tight brazing and a coating layer at said inner peripheral boundary of said flanged portion.

16. The method according to claim 11, further comprising providing said disc-shaped material by punching said disc-shaped material from a sheet of material.

17. The method according to claim 16, wherein the deforming of the portion of said cylindrical portion into the annular flanged portion results in a lamination of said portion of said cylindrical portion, with said lamination defining said annular flanged portion.

18. The method according to claim 17, further comprising forming a screw hole in said annular flanged portion.

19. The method according to claim 18, wherein the deforming of said portion of said cylindrical portion into the lamination results in an inner peripheral boundary portion of said flanged portion being in communication with said screw hole, and further comprising providing a water-tight brazing and a coating layer at said inner peripheral boundary of said flanged portion.

* * * * *